United States Patent [19]

Maeba et al.

[11] Patent Number: 4,787,022

[45] Date of Patent: Nov. 22, 1988

[54] HIGH VOLTAGE POWER SOURCE FOR A DISCHARGE TUBE

[75] Inventors: Yukio Maeba, Kyoto; Masashi Nakasaka, Nagaokakyo, both of Japan

[73] Assignee: Murata Manufacturing Co., Ltd., Kyoto, Japan

[21] Appl. No.: 29,668

[22] Filed: Mar. 24, 1987

[30] Foreign Application Priority Data

Mar. 26, 1986 [JP] Japan ................................ 61-68189

[51] Int. Cl.[4] ............................................ H02H 7/125

[52] U.S. Cl. ........................................ 363/52; 361/90; 363/69

[58] Field of Search ...................... 361/89, 90; 363/52, 363/53, 54, 69, 70

[56] References Cited

U.S. PATENT DOCUMENTS

| | | | |
|---|---|---|---|
| 3,573,598 | 4/1971 | Clarke et al. | 363/54 X |
| 3,800,198 | 3/1974 | Graf et al. | 361/90 X |
| 4,063,148 | 12/1977 | Fehlmann et al. | 361/90 X |
| 4,402,029 | 8/1983 | Fujita | 361/90 |
| 4,541,029 | 9/1985 | Ohyama | 361/90 X |
| 4,571,690 | 2/1986 | Munetsugu | 361/90 X |
| 4,642,479 | 2/1987 | Lombardi et al. | 361/89 X |

*Primary Examiner*—Patrick R. Salce
*Assistant Examiner*—Marc S. Hoff
*Attorney, Agent, or Firm*—Wenderoth, Lind & Ponack

[57] ABSTRACT

A high voltage power source for supplying a DC high voltage to a discharge tube, can detect an abnormality when created at the discharge tube side and stop its output. The high voltage power source is provided with a detector circuit which detects when the DC high voltage is larger than a predetermined reference value and a control circuit which cuts off the output of the DC high voltage in response to the above detection. When an abnormality occurs at the discharge tube, for example, non-operation or unstable operation occurs, since a load becomes lighter than normal, and the DC high voltage to be supplied to the discharge tube becomes higher than normal and is detected by the detector circuit so that the control circuit responds to the detected high voltage and cuts off the output of the DC high voltage.

4 Claims, 1 Drawing Sheet

HIGH VOLTAGE POWER SOURCE FOR A DISCHARGE TUBE

BACKGROUND OF THE INVENTION

The present invention relates to a high voltage power source for supplying a DC high voltage to a discharge tube, such as a laser tube.

FIG. 3 is a block diagram exemplary of the conventional high voltage power source for the discharge tube, in which a high voltage power source 2 is provided with an oscillator circuit 4 which outputs an AC voltage on a basis of a DC or AC input voltage V1, a booster circuit 6 for boosting the AC voltage up to a predetermined high voltage, a rectifier circuit 8 for rectifying the boosted AC voltage and for supplying the output voltage (DC high voltage) V2 to a load consisting of a discharge tube 12, such as a lser tube, and a control circuit 10 which controls, for example, the oscillator circuit 4 to carry out constant-current control for a load current I flowing in the discharge tube 12.

The above-mentioned discharge tube 12, such as the laser tube, connected to the high voltage power source 2 is generally inferior to the high voltage power source 2 in lifetime or reliability.

The conventional high voltage power source 2, however, will continue outputting the high voltage V2 even when the discharge tube 12 is abnormal to lead to an abnormal operation of the system because the discharge tube 12 does not operate (non-oscillation for the laser tube) or deteriorates so as to be unstable in operation, which is dangerous for the system.

SUMMARY OF THE INVENTION

A first object of the invention is to provide a high voltage power source for a discharge tube, which, when the discharge tube is abnormal, can detect the abnormality to cut off the high voltage output.

A second object of the invention is to provide a high voltae power source for a discharge tube, which cuts off the high voltage output when the discharge tube is abnormal, thereby enabling the safety of the system to be greatly improved.

BRIEF DESCRIPTION OF THE DRAWINGS

The above and other objects and features of the invention will appear more fully hereinafter from a consideration of the following description taken in connection with the accompanying drawing wherein one example is illustrated by way of example.

DESCRIPTION OF THE PREFERRED EMBODIMENT

Figure 1:
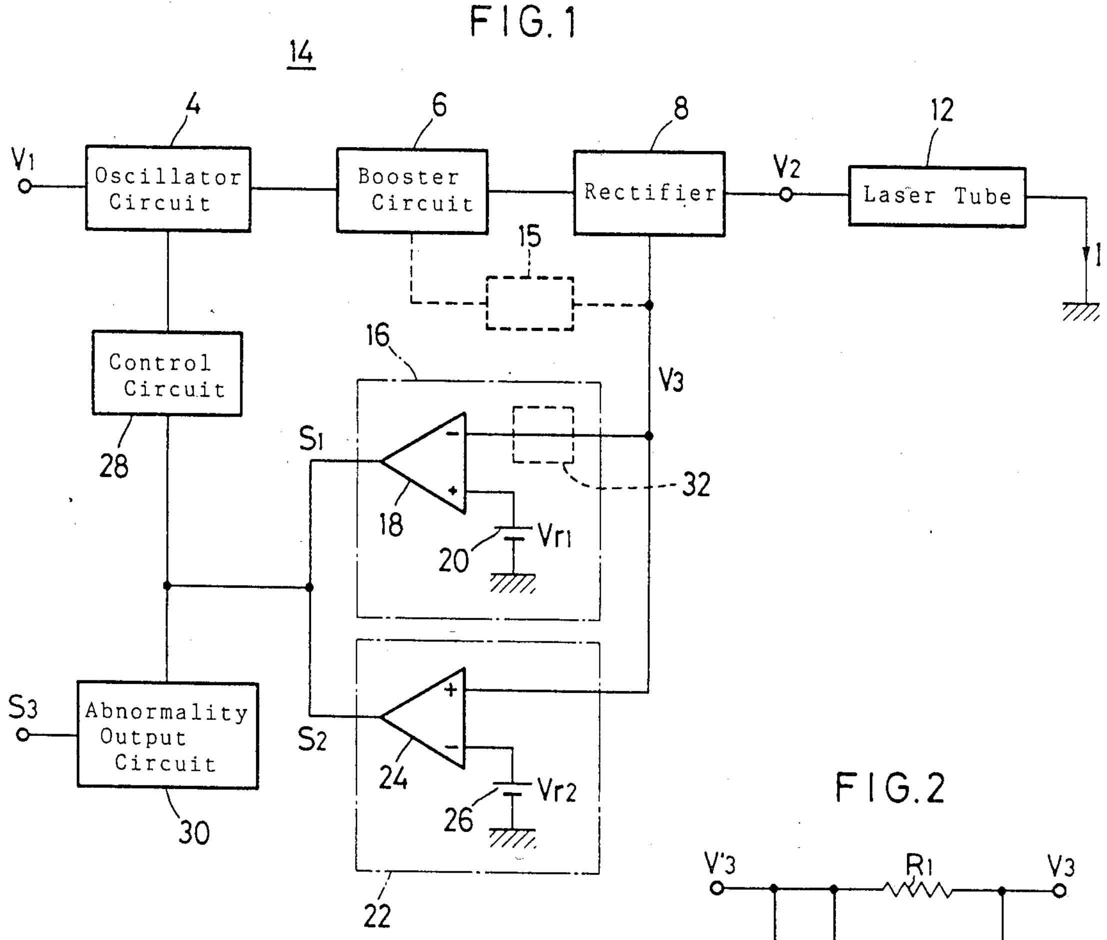
FIG. 1 is a block diagram of an embodiment of a high voltage power source for a discharge tube of the present invention.
Figure 2:
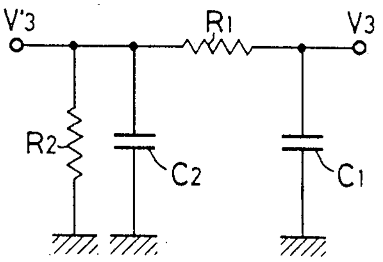
FIG. 2 is a circuit diagram exemplary of a delay circuit.
Figure 3:
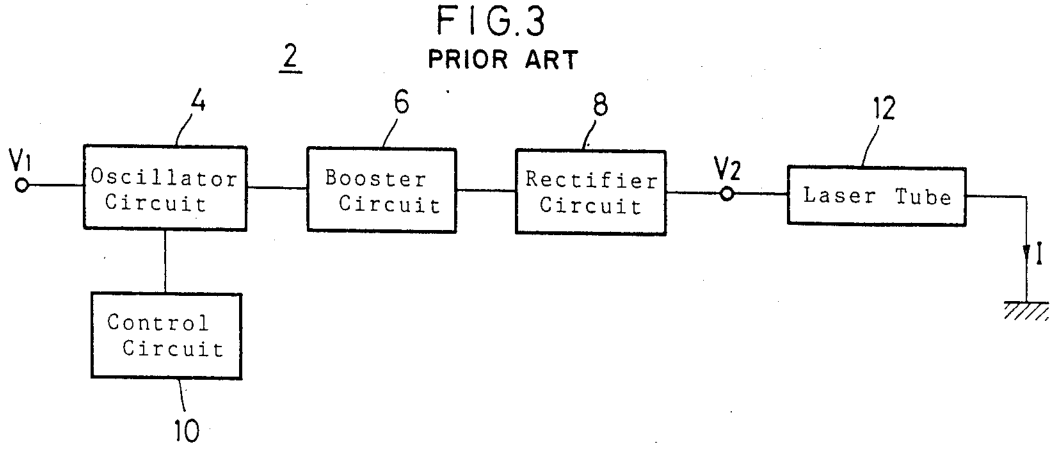
FIG. 3 PRIOR ART
FIG. 3 is a block diagram exemplary of the conventional high voltage power source for a discharge tube.

Referring to FIG. 1, a high voltage power source for a discharge tube of the present invention is shown, in which components which are the same as those in the conventional example of FIG. 3 are designated by the same reference numerals and a detailed explanation has been omitted.

In FIG. 1, a high voltage power source 14 of the present invention is adapted to obtain a DC voltage V3 from a rectifier circuit 8 corresponding to (for example, in proportion to) an output voltage (DC high voltage) V2 from the rectifier circuit 8, the voltage V3 being introduced into an excessive voltage detector circuit 16 and further, in this embodiment, into an undervoltage detector circuit 22. Alternatively, the voltage V3 may be obtained by receiving an AC voltage from, for example, the booster circuit 6 corresponding to the output voltage prior to rectification, and by rectifying the voltage using another rectifier circuit 15. Or, the voltage obtained from the rectifier circuit 8 may be supplied to one of the excessive voltage detector circuit 16 and undervoltage detector circuit 22, and a voltage obtained from another rectifier circuit supplied to the other voltage detector circuit.

The excessive voltage detector circuit 16 in this embodiment is provided with a comparator circuit 18 and a reference power source 20, so that the voltage V3 is fed to the negative input line of the comparator circuit 18 and the reference voltage Vr1 from the reference power source 20 is fed to the positive input line thereof. The comparator circuit 18, when the voltage V3 becomes higher than the reference voltage Vr1, sets its output signal S1 at a low level. The reference voltage Vr1 is set to a voltage corresponding to a voltage which is somewhat higher than the output voltage V2 (for example, about 2 KV) when the discharge tube 12 is normal.

The undervoltage detector circuit 22, in this embodiment, is provided with a comparator circuit 24 and a reference power source 26, so that the voltage V3 is fed to the positive input line of the comparator circuit 24 and the reference voltage Vr2 from the reference power source 26 is fed to the negative input line thereof. The comparator circuit 24, when the voltage V3 is lower than the reference voltage Vr2, sets its output signal S2 at a low level. The reference voltage Vr2 is set to voltage corresponding to voltage which is somewhat lower than the output voltage V2 (for example, about 2 KV) when the discharge tube 12 is normal.

The outputs of the excessive voltage detector circuit 16 and undervoltage detector circuit 22, in other words, the output signals S1 and S2 of the comparator circuits 18 and 24, are fed to a control circuit 28 and, in this embodiment, also fed to an abnormality output circuit 30.

The control circuit 28 in this embodiment has a function to stop delivery of the output voltage V2 when at least one of the output signals S1 and S2 is at a low level, in addition to a function of constantcurrent-controlling the load current I flowing in the discharge tube 12. The stopping of the delivery of the output voltage V2 in this embodiment is carried out by stopping the oscillation of oscillator circuit 4.

The abnormality output circuit 30 outputs an alarm signal S3 when at least one of the output signals S1, and S2 is at a low level.

Next, an example of the entire operation of the power source of the present invention will be described. In a case where the discharge tube becomes abnormal, for example, non-operation after the lifetime is over or unstable operation takes place due to deterioration in its characteristics, since the load becomes abnormally light, the output voltage V2 fed to the discharge tube 12 becomes higher than the voltage during normal conditions. Accompanied by this, the voltage V3 becomes higher than the reference voltage Vr1. As a result, the output signal S1 from the excessive voltage detector circuit 16 becomes a low level and the control circuit 28 stops oscillation of the oscillator circuit 4 in response to the output signal S1, thereby cutting off the output of voltage V2. Also, the state where the output line of rectifier circuit 8 is open by non-connection to the discharge tube 12, is detected in the same fashion as noted above, thereby cutting off the delivery of the output voltage V2. As a result, the high voltage power source 14, and in turn, the entire system is improved in safety.

In addition, the undervoltage detector circuit 22 and abnormal output circuit 30 are not indispensable, but may be provided as in the illustrated embodiment. When the undervoltage detector circuit 22 is provided, the voltage V3 becomes lower than the reference voltage Vr2 accompanied by the output voltage V2 when abnormally dropped due to a short circuit or poor insulation at the output line of rectifier circuit 8, whereby the output signal S2 is at a low level to enable the delivery of the output voltage V2 to be stopped. As a result, various elements are prevented from breakdown.

The abnormality output circuit 30, when provided, can output an alarm signal S3 when an abnormality occurs due to excessive or under output voltage V2 as above-mentioned. Assuming that the alarm signal S3 is received by a high-order control unit having, for example, a microprocessor, it is easy to develop other functions.

In addition, in the discharge tube 12, such as the laser tube, a firing failure may occur when starting, especially when starting in a cooled condition. The excessive voltage detector circuit 16, even in this case, detects the firing failure to lead to cutoff of the output voltage V2. However, since several firing failures cannot be said to be especially abnormal, it is preferable to provide as a compensation means for such several firing failures a delay circuit 32 disposed before the negative input of the comparator circuit 18 at the excessive voltage detector circuit 16.

The delay circuit 32, for example, as that shown in FIG. 3, is an integration circuit consisting of a combination of resistors R1 and R2 (R2≧R1) and capacitors C1 and C2 and having a proper time constant. The voltage V3 has a saw tooth component due to the repetition of firing failures and is delayed (integrated), whereby the output voltage V3′ gradually rises.

Hence, when the output voltage V3′ is supplied to the negative input at the comparator circuit 18 and the constant at the delay circuit 32 is properly selected, the output voltage V3′ becomes larger than the reference voltage Vr1 for the first time after several firing failures occur, (in other words, for example, several seconds later) when starting, thereby enabling the output voltage V2 to be cut off. In this case, the constant at the delay circuit 32, in other words, the timing to cut off delivery of the output voltage V2, need only be decided corresponding to the characteristics of the discharge tube 12.

Accordingly, when the delay circuit 32 is provided, compensation for the firing failure at the discharge tube 12 when starting is possible and also when the firing failures continue for a predetermined member of times, the delivery of the output voltage V2 is stopped to enable the discharge tube 12 to be protected.

While a preferred embodiment of the invention has been described using specific terms, such a description is for illustrative purposes only, and it is to be understood that changes and variations may be made without departing from the spirit and scope of the following claims.

What is claimed is:

1. A high voltage power source for supplying a high DC voltage to a discharge tube, said power source comprising:

a means for generating an AC signal;

a first rectifier means for rectifying said AC signal into said high DC voltage fed to said discharge tube;

a second rectifier means for rectifying said AC signal into another DC voltage which is proportional to said high DC voltage;

a control circuit means connected to said means for generating an AC signal for controlling said means in response to control signals input thereto;

an excessive voltage comparator means for receiving said another DC voltage and a voltage output from a first reference voltage source and for supplying a control signal to said control circuit means instructing said control circuit means to disable said means for generating an AC signal when said another DC voltage is greater than said output from said first reference voltage source, whereby the generation of said high DC voltage is stopped;

an undervoltage comparator means for receiving said another DC voltage and a voltage output from a second reference voltage source and for supplying a control signal to said control circuit means instructing said control circuit means to disable said means for generating an AC signal when said another DC voltage is less than said voltage output from said second reference voltage, whereby the generation of said high DC voltage is stopped.

2. A high voltage power source as recited in claim 1, further comprising a delay means disposed between said second rectifier means and said excessive voltage comparator for delaying said another DC voltage fed thereto.

3. A high voltage power source as recited in claim 1, wherein said excessive voltage comparator means comprises a first comparator circuit having a positive input connected to said first reference voltage source and a negative input connected to said rectifier means, said voltage output from first reference voltage source being a positive DC voltage;

and wherein said undervoltage comparator means comprises a second comparator circit having a positive input connected to said rectifier means and having a negative input connected to said second reference voltage source, said voltage output from said second reference voltage source being a positive DC voltage.

4. A high voltage power source as recited in claim 2, wherein said excessive voltage comparator means comprises a first comparator circuit having a positive input connected to said first reference voltage source and a negative input connected to said rectifier means, said voltage output from first reference voltage source being a positive DC voltage;

and wherein said undervoltage comparator means comprises a second comparator circuit having a positive input connected to said rectifier means and having a negative input connected to said second reference voltage source, said voltage output from said second reference voltage source being a positive DC voltage.

* * * * *